May 31, 1932. B. CROCKER 1,861,381
METHOD OF COLLECTING AND CLASSIFYING DIFFERENT
KINDS OF SOLIDS SUSPENDED IN A LIQUID
Filed April 17, 1930 2 Sheets-Sheet 1
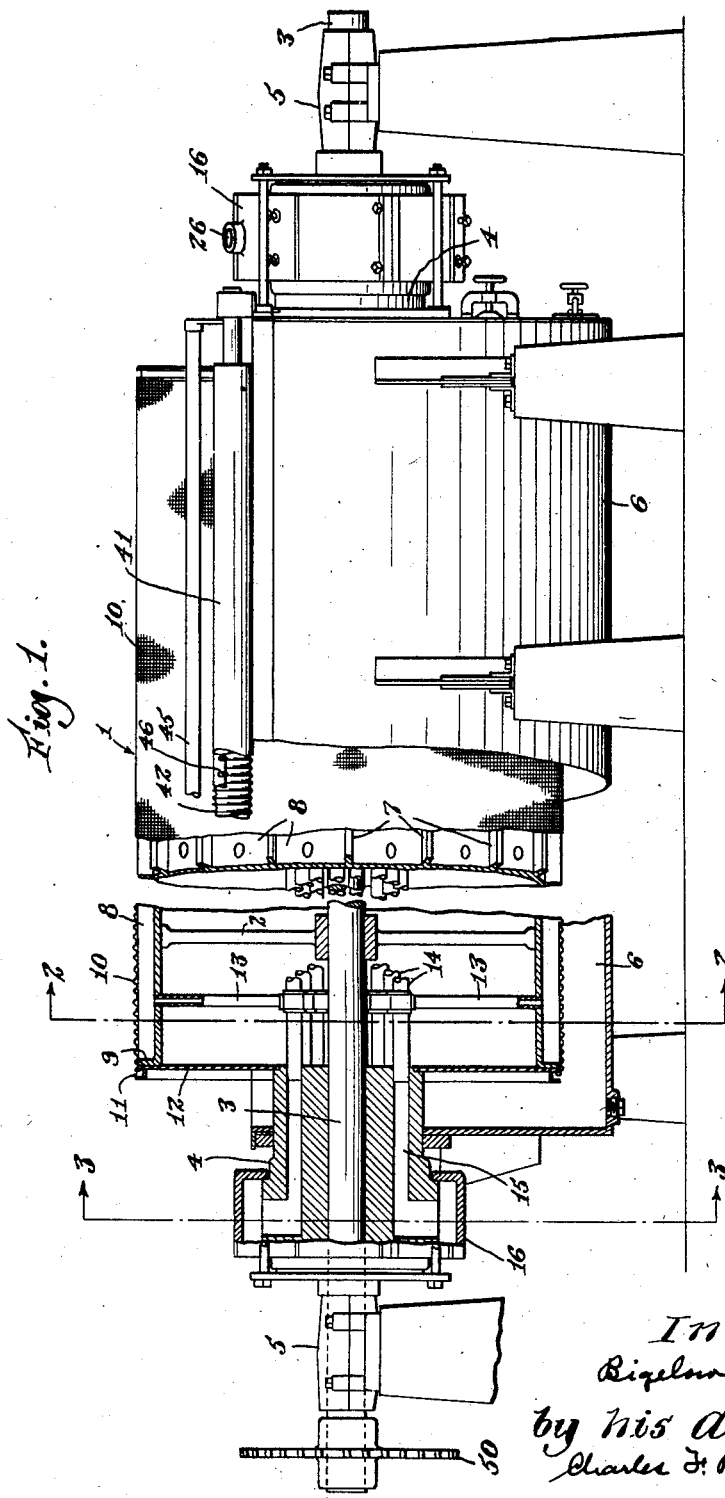
Inventor
Bigelow Crocker,
by his Attorney
Charles F. Richardson.

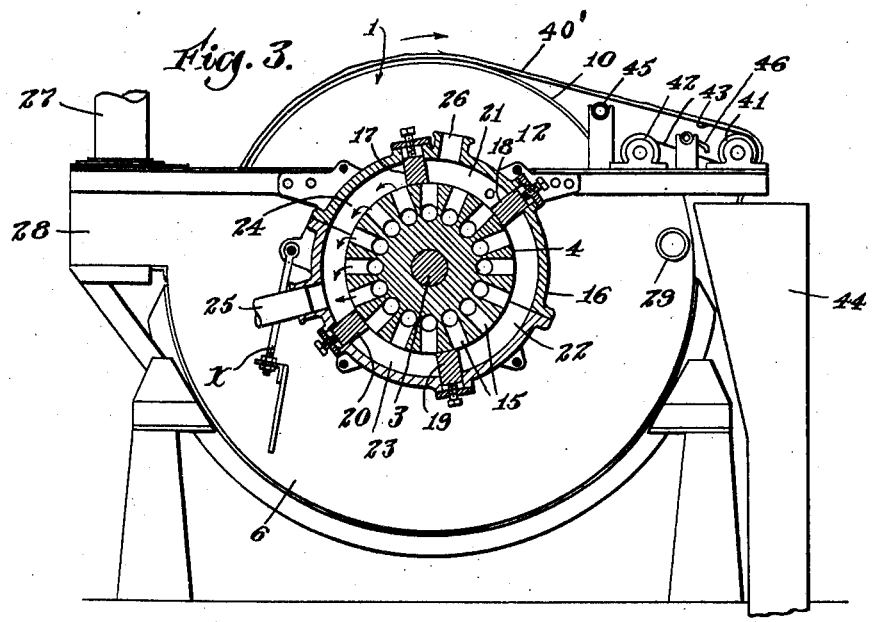
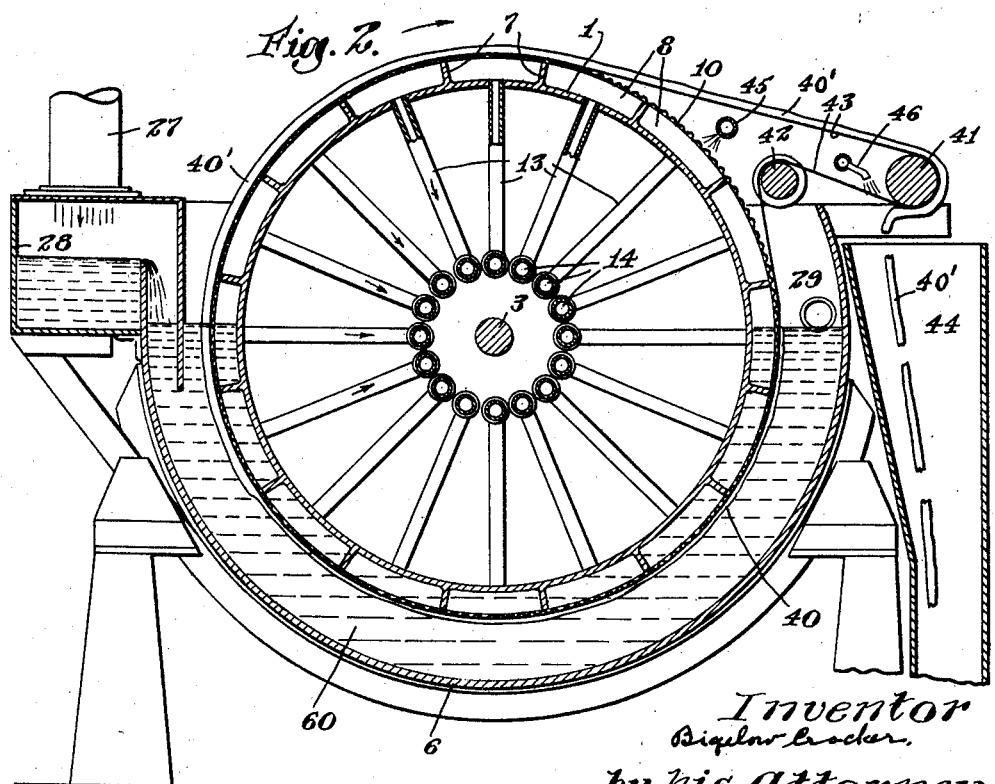

Patented May 31, 1932

1,861,381

UNITED STATES PATENT OFFICE

BIGELOW CROCKER, OF FITCHBURG, MASSACHUSETTS

METHOD OF COLLECTING AND CLASSIFYING DIFFERENT KINDS OF SOLIDS SUSPENDED IN A LIQUID

Application filed April 17, 1930. Serial No. 445,110.

My invention relates to, and resides in, a new method whereby two or more different kinds of solids suspended in a liquid, may be collected and classified.

It is particularly applicable to the paper-making art, and may be employed by removing physical impurities, such as carbon particles, particles of clay, or saponified ink, from defibered paper-making material suspended in water.

As is well known, the liquid delivered, say, from a defibering machine, is composed mostly of water in which are suspended defibered paper-making material, saponified ink, carbon particles, particles of clay, and/or other insoluble materials; and it is common practice to separate said defibered paper-making material from said liquid, by allowing the same to pass through a wire screen by gravity; the screen retaining wet fibers, and permitting waste water and suspended impurities to escape.

I have found up investigation that the waste that has passed through the screen, contains not only dirty water, saponified ink, particles of carbon, and/or particles of clay, but also a substantial amount of short paper-making fibers.

Now the principal object of my invention is to reclaim and save these lost paper-making fibers, to an extent much greater than has heretofore been possible, and to attain this object, I make use of my discovery, namely:—that by means of a vacuum, saponified ink, particles of carbon and/or particles of clay suspended in water may be drawn through, and from, a filter composed of paper-making fiber.

To be more specific: I find that by drawing, by means of a vacuum, said liquid through a wire screen, fibers, suspended in liquid, at once begin to form upon the screen, a filter of fibers; that said fiber filter, filters out the long and short fibers from said liquid; that said fiber filter, while acting as a filter, develops the physical characteristic of allowing the vacuum to draw therethrough, not only said water, but said impurities, or particles of carbon, particles of clay, and/or saponified ink suspended in said liquid; and that by use of this process or method embracing this discovered characteristic of defibered paper-making material, a large percentage of the previously lost fibers is saved, and material impurities or particles, some of which would otherwise have remained in the fiber filter, are sucked through and away from said fiber filter, while the latter is later recovered or reclaimed and made into paper. In fine, by means of my new method, two or more different kinds of solids, such as defibered paper-making material on the one hand, and physical impurities, such as said carbon particles and the like on the other, may be collected and classified and put to valuable uses.

The rotary screen, herein shown and described, is no invention of mine. It is of known construction, embraces features, some of which are protected by U. S. Letters Patent No. 1,472,574, granted to Arthur Wright, of Upper Montclair, N. J., and others is described and claimed in U. S. application Serial No. 115,481, filed by him June 12, 1926; it is the best apparatus now known to me whereby my new method may be practiced. It is of course to be understood that once my discovery or method based thereon are apprehended, other apparatus may become obviously suitable, or be rendered so, to carry out my new method.

In the drawings illustrating this preferred form of apparatus employed by me,

Fig. 1 is a view in front elevation, and partly in longitudinal section, showing the interior of a rotary wire-screen, catch-compartments, pipes, and manifold valve controlling the vacuum and atmospheric pressures used in reclaiming and forming the paper-fiber filter, and sucking therethrough saponified ink, particles of fiber and/or of clay.

Fig. 2 is a cross-section, on line 2—2, Fig. 1, and shows the flow of liquid holding defibered paper and impurities, the formation of paper-fiber filter upon the rotary screen, the withdrawal of water and said impurities through said filter fiber by suction due to said vacuum, and the removal of the reclaimed paper-filter from the rotary screen.

Fig. 3 is an end view of said rotary screen, the cross-section shown being on line 3—3 of Fig. 1, of the manifold valve controlling the extent and timing of flowage of said liquid through the fiber filter, catch-compartments, and pipes, and the drainage of said water and suspended impurities.

A rotary drum 1, Fig. 1, about 4½ feet in diameter, is mounted by spider-arms 2 upon a shaft 3, having formed thereon a manifold discharge-valve 4, Figs. 1 and 3, and journals supported in suitable supporting-bearings 5, Fig. 1. Between these bearings is a vat 6 in which the drum 1, Figs. 1 and 2, may be rotated and be partially immersed when water, defibered paper-stock and impurities are introduced into the vat.

The outside surface of the drum 1 is divided longitudinally by a number of fins 7 to form a number of catch-compartments 8 whose opposite ends are closed by raised circumferential flanges 9, Fig. 1. A screen 10 of brass having a mesh of say No. 60, is wrapped around the drum, supported upon said longitudinal fins and flanges, and there secured and bound in place, by binding wires, not shown, extending into grooves 11 provided in end plates 12.

Connected to each of these compartments is a series of radial outlet-pipes 13, which, in turn, communicate with a corresponding head-pipe 14 extending lengthwise of the drum, said head-pipes being cylindrically arranged about the longitudinal axis of the drum, and communicating at each end of the drum with corresponding longitudinal channels 15 in said manifold discharge-valve, whose outlets open radially outwardly into a discharge chamber formed by a cylindrical housing 16, Figs. 1 and 3, concentric with the manifold valve and provided with adjustable wooden dams, 17, 18, 19, 20, radially mounted in the housing and movable into and out of sliding engagement with the manifold valve. A screw connection $x$ adjustably connects the housing 16 and vat 6. Two of these dams 17 and 20, Fig. 3, are positioned and used seasonably to subject the longitudinal catch-compartments 8 of the drum, successively to atmospheric pressure and to the action of a vacuum, by dividing the discharge chamber into what may be called "atmospheric chambers" 21, 22, and 23, and a "vacuum chamber" 24; the sizes and dispositions of which depend upon, and are determined by the requirements as to number, and time of exposure, of the longitudinal catch-compartments to said successive actions of atmospheric pressure and vacuum. A vacuum discharge pipe 25 leads from the vacuum chamber 24 and is controlled by a vacuum pump, not shown; while an atmospheric port 26 leads into said atmospheric chamber 21.

It is understood, of course, that each end-portion of the rotary screen with its manifold discharge-valve is alike in structure and operation.

The vat 6, Fig. 2, has a feed line-pipe 27, opening into a feed box 28 discharging into the vat, and an overflow outlet 29.

For the purpose of reclaiming the paper-fibers formed into a fiber-filter 40', and removing the same from the wire-screen 10 upon the drum, there is provided a string conveyer, comprising two rolls, a discharge-roll 41, and a return roll 42, parallel with the axis of the drum, with guide-grooves about one-half an inch apart, having separate string-belts 43 therein, that pass around the discharge-roll 41 located above a collecting-pipe 44, leading, say, to a stock-chest, not shown.

Longitudinally between the string-conveyer, are two water-sprays, one, 45, a drum-spray, to clean the screen surface of the drum, and wash away any bits of paper-fiber that may remain on the wire mesh, and the other, 46, a discharge roll-spray, to force off from the conveyer-strings, the reclaimed fiber filter and allow it to drop into the collecting pipe.

Upon the outer end portion of the shaft is a sprocket-wheel 50, receiving its power as by a chain-belt to be driven at a desired speed by any suitable source of power.

The following is a description of the operation of my invention:

A constant flow of water and suspended material 60, consisting of defibered paper-stock, saponified ink, clay, and/or carbon particles, is delivered from the feed-line pipe 27 to the feed-box 28, and thence into the vat, filling the same to about the height indicated in Fig. 2; any excess flowing out through the overflow outlet 29.

The dams 17, 18, 19 and 20, Fig. 3, being adjusted to form the "atmospheric-chambers" 21, 22, 23, and the "vacuum-chamber" 24, for example as shown, power is applied through the chain drive, the drum turning in the direction indicated, at about 7½ revolutions per minute; clean water is caused to flow through the drum-roll spray 45 and the discharge-roll spray 46; and the vacuum-pump is set in motion, creating, for example, 5" of vacuum.

The water and suspended matter 60, Fig. 2, at once begin to flow towards and through the immersed portions of the wire screen 10, and into the underlying, longitudinal catch-compartments 8, of the drum; an extremely thin deposit 40 of fiber forming on the screen 10, and string conveyers 43, and making an initial fiber filter foundation 40. As the discharge outlets of the manifold valve 4, Fig. 3, for the catch-compartments with their skimming of fiber, pass from the "atmospheric chamber" 23 to the vacuum chamber 24, these exposed outlets of the manifold valve become, as indicated by arrows in Fig. 3, subjected to the action of the vacuum pump, and the flowage of liquid through the paper fiber skimming 40, Fig. 2, on the screen 10, over its respective immersed compartments, is quickly and greatly increased; the initial fiber skimming catches, holds and builds up all of the on-coming long and short defibered paper fibers into a filter 40', and at the same time permits a large percentage of the saponified ink, particles of carbon and/or particles of clay to be sucked by the vacuum, through the defibered paper-stock filter 40', through their respective catch-compartments 8, radial outlet pipes 13, vacuum valve 4, vacuum discharge pipes 25, and into a waste pipe or retainer, not shown.

As this oncoming paper-stock-fiber filter moves up, out of the liquid in the vat, the vacuum discharge-valve continues to allow the vacuum-pump to operate on the filter now exposed to the atmosphere, sucking air through the same, drying it, and withdrawing water and impurities from the catch-compartments, through said outlet pipes, manifold-valve and vacuum-chamber to the discharge outlet.

Just before the direction of the delivery conveyer-strings, with paper-fiber-filter thereon, become tangential to the circumference of these catch-compartments, their outlet pipes in the manifold-discharge-valve, pass into the "atmospheric-chamber" 21, Fig. 2; the fiber-filter is no longer subjected to the action of the vacuum-pump; has become about ⅛ of an inch thick, and sufficiently dry and strong to be moved on the string-conveyer away from the receding wire-screen of the drum, without being torn or mutilated. This sheet of moist reclaimed paper, minus the objectionable impurities, continues on the string-conveyer to, over and under the discharge roll 41, where it drops away from the string-conveyer, by reason of its own weight, and/or by the aid of the discharge-roll spray 46, into the collecting-pipe 44, leading, say, to a stock-chest, not shown.

Any paper-fiber that may be left on the wire-screen after the sheet of reclaimed fiber has been removed, is washed by the drum-spray 45, back into the vat, to be again subjected to the above described process.

Plainly, by this continuous movement of the above described apparatus, there is formed a continuous filter of defibered paper stock that most efficiently filters out both long and short defibered paper fibers held suspended in the water, and yet permits a vacuum to suck through and out of said filter of paper-fibers, such impurities as saponified ink, particles of carbon, and/or particles of clay, to be cast away.

For the sake of clearness, the thickness of the initial fiber-filter formed under atmospheric pressure, and that under a vacuum, shown in the drawings, are tremendously exaggerated in relation to the size of the machine. As already stated, the diameter of the rotary drum is about 4½ feet, while the thickness of the sheet of reclaimed fiber, on leaving the drum, is not more than ⅛ of an inch.

Desiring to protect my invention in the broadest manner legally possible, what I claim is:

A process for separating particles of impurities from paper stock fibers suspended in water, comprising moving a filter screen into, through and out of the water, and causing, after the entrance of the screen into the water, an initial filter of paper-making fiber to form on the screen; and thereafter applying suction to build up the initial filter with oncoming fibers, and form a resulting filter of fibers, and to draw water and impurities through and away from the resulting filter of fibers, during a period of time subsequent to the entrance of the screen into the water, but prior to the emergence of the screen and resulting fiber from said water.

In testimony whereof I hereunto affix my signature.

BIGELOW CROCKER.